United States Patent
Prahl

(10) Patent No.: US 12,077,137 B2
(45) Date of Patent: Sep. 3, 2024

(54) SLIDING PEDAL AND BASE ASSEMBLY

(71) Applicant: ZF Off-Highway Solutions Minnesota Inc, North Mankato, MN (US)

(72) Inventor: Mike Prahl, North Garden City, MN (US)

(73) Assignee: ZF Off-Highway Solutions Minnesota Inc, North Mankato, MN (US)

( * ) Notice: Subject to any disclaimer, the term of this patent is extended or adjusted under 35 U.S.C. 154(b) by 0 days.

(21) Appl. No.: 18/066,421

(22) Filed: Dec. 15, 2022

(65) Prior Publication Data
US 2024/0198980 A1 Jun. 20, 2024

(51) Int. Cl.
*B60T 7/04* (2006.01)
*B60T 7/06* (2006.01)
*G05G 1/30* (2008.04)
*G05G 1/40* (2008.04)

(52) U.S. Cl.
CPC . B60T 7/06 (2013.01); G05G 1/40 (2013.01)

(58) Field of Classification Search
CPC ........... G05G 1/30; G05G 1/40; G05G 1/405; G05G 1/44; G05G 1/445; G05G 1/46; B60T 7/04; B60T 7/06; B60K 2026/024; B60K 2026/026
See application file for complete search history.

(56) References Cited

U.S. PATENT DOCUMENTS

| | | | | |
|---|---|---|---|---|
| 3,151,499 A * | 10/1964 | Roe | | G05G 1/487 477/211 |
| 4,182,198 A * | 1/1980 | Dartnell | | B60K 26/02 74/513 |
| 4,454,497 A * | 6/1984 | Morse | | B60T 15/00 74/478.5 |
| 6,364,047 B1 * | 4/2002 | Bortolon | | B60K 23/02 74/513 |
| 2001/0047696 A1 * | 12/2001 | Fukase | | G05G 1/405 74/512 |
| 2002/0148668 A1 | 10/2002 | Smythe | | |
| 2002/0157497 A1 * | 10/2002 | Porter | | G05G 1/405 74/512 |
| 2004/0134305 A1 * | 7/2004 | Peniston | | G05G 1/483 74/560 |
| 2005/0211012 A1 * | 9/2005 | Doucet | | G05G 1/44 74/560 |
| 2013/0133471 A1 | 5/2013 | Tchernyi et al. | | |
| 2017/0043662 A1 | 2/2017 | Perusic | | |

FOREIGN PATENT DOCUMENTS

CN 111976671 A * 11/2020 ................ B60T 7/06

OTHER PUBLICATIONS

Machine Translation of CN 111976671.*
International Search Report/Writen Opinion Corresponding to PCT/IB2023/059618 mailed Jan. 3, 2024.

* cited by examiner

*Primary Examiner* — Adam D Rogers
(74) *Attorney, Agent, or Firm* — Finch & Maloney PLLC

(57) ABSTRACT

A sliding brake pedal and base assembly includes a sled, a brake pedal rotationally attached to the sled, a brake valve with an input piston, a base fixedly attached to the brake valve, and a lever generally moveable in a first linear direction parallel to a direction of movement of the input piston. The lever receives an actuating force from the brake pedal and delivers the actuating force to a top surface of the input piston. The sled is controllably moveable in a second linear direction orthogonal to the first linear direction.

12 Claims, 5 Drawing Sheets

SLIDING PEDAL AND BASE ASSEMBLY

FIELD OF THE DISCLOSURE

The present disclosure is generally directed to brake systems and more particularly to a sliding pedal and base assembly.

BACKGROUND

Typical off-road vehicles use full power hydraulic brake valves that use heavy, stiff hydraulic hoses or rigid metallic tubing for hydraulic lines and do not allow the brake valve to move. In such current practice, the assembly including the brake pedal and base is in a fixed location. This can be uncomfortable for some drivers who would prefer the brake pedal to be closer or farther away than a standard placement. One approach to solving this problem in off-road vehicles is to place the entire pedal and valve assembly on a rack that is positioned fore and aft by a motorized pinion on the rack.

SUMMARY

It is an object of the present invention to overcome the above-mentioned shortcomings and drawbacks associated with the current technology.

The present disclosure relates to a sliding brake pedal as well as a brake pedal and base assembly. In one embodiment, a brake pedal and base assembly comprising a sled, a brake pedal rotationally attached to the sled, a brake valve with an input piston, a base fixedly attached to the brake valve, and a lever generally moveable in a first linear direction parallel to a direction of movement of the input piston. The lever receives an actuating force from the brake pedal and delivers the actuating force to a top surface of the input piston. The sled is controllably moveable in a second linear direction orthogonal to the first linear direction.

Various objects, features, aspects, and advantages of the present invention will become more apparent from the following detailed description, along with the accompanying drawings in which like numerals represent like components. The present disclosure may address one or more of the problems and deficiencies of the current technology discussed herein. However, it is contemplated that the invention may prove useful in addressing other problems and deficiencies in a number of technical areas. Therefore, the claimed invention should not necessarily be construed as limited to addressing any of the particular problems or deficiencies discussed herein.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily drawn to scale since the emphasis is instead placed on illustrating the principles of the invention. The invention will now be described, by way of example, with reference to the accompanying drawings in which.

DETAILED DESCRIPTION

The present invention will be understood by reference to the following detailed description, which should be read in conjunction with the appended drawings. It is to be appreciated that the following detailed description of various embodiments is by way of example only and is not meant to limit, in any way, the scope of the present invention. In the summary above, in the following detailed description, in the claims below, and in the accompanying drawings, reference is made to particular features (including method steps) of the present invention.

It is to be understood that the disclosure of the invention in this specification includes all possible combinations of such particular features, not just those explicitly described. For example, where a particular feature is disclosed in the context of a particular aspect or embodiment of the invention or a particular claim, that feature can also be used, to the extent possible, in combination with and/or in the context of other particular aspects and embodiments of the invention, and in the invention generally.

The terms "comprise(s)," "include(s)," "having," "has," "can," "contain(s)," and grammatical equivalents and variants thereof, as used herein, are intended to be open-ended transitional phrases, terms, or words that do not preclude the possibility of additional acts or structures, are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Figure 1:
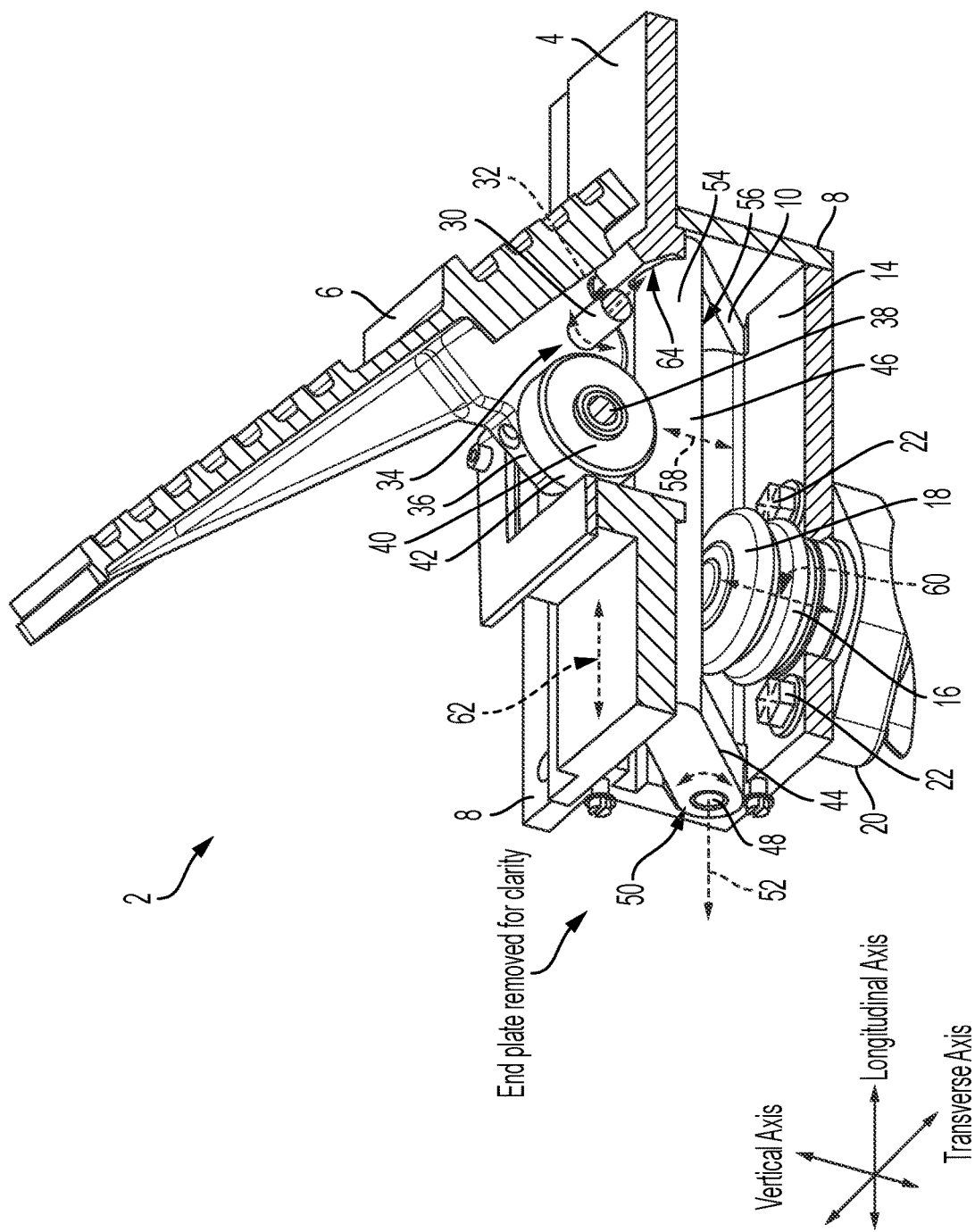
FIG. 1 is an isomeric sectional view of a first embodiment of the disclosed sliding brake pedal and base assembly.

The singular forms "a," "and" and "the" include plural references unless the context clearly dictates otherwise. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Where spatial directions are given, for example above, below, top, and bottom, such directions refer to the sliding pedal and base assembly as represented in FIG. 1, unless identified otherwise.

The embodiments set forth the below represent the necessary information to enable those skilled in the art to practice the invention and illustrate the best mode of practicing the invention. For the measurements listed, embodiments including measurements plus or minus the measurement times 5%, 10%, 20%, 50% and 75% are also contemplated. For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. The term "substantially" means that the property is within +/−10% of the stated value. The term "substantially complete" means that a process is at least 90% complete.

In addition, the invention does not require that all the advantageous features and all the advantages of any of the embodiments need to be incorporated into every embodiment of the invention.

As stated above, one approach to solving the problem of brake placement in off-road vehicles is to place the entire pedal and valve assembly on a rack that is positioned fore and aft by a motorized pinion on the rack. However, this may place the valve into the operator cabin, resulting in increased noise and heat in the cabin. For the foregoing reasons, there is a continuing need for a brake system that allows a vehicle operator to adjust the distance of the brake pedal in relation to the operator and operate a fixed brake valve assembly substantially located outside of the cabin. Various embodiments disclosed herein can solve this problem and others that are present in off-road braking systems.

Turning now to FIG. 1, a brief description concerning the various components of one embodiment will now be briefly discussed. As can be seen in this embodiment, the sliding pedal and base assembly 2 includes a sled 4, a brake pedal 6 rotationally attached to the sled 4, a base 8, and a lever 10, wherein the sled 4 is movable along a longitudinal axis with respect to a brake valve 12, which is fixedly attached to a cabin floor 14.

The brake valve 12 includes an input piston 16. A top surface 18 of the input piston 16 preferably extends through the cabin floor 14. The brake valve 12 is fixedly attached to the cabin floor via a flange 20 and plurality of flange fasteners 22. The brake valve 12 has a first valve opening 24 and a second valve opening 26, through which brake circuits of the vehicle may be charged with hydraulic fluid and thereby hydraulic pressure for generating a braking force at the wheel brakes. The brake valve 12 has a third valve opening 28 (FIG. 2A) that may be connected to a tank for receiving brake fluid or to a pressure compensation tank.

The sled 4 includes a pedal shaft 30 fixedly attached to the sled 4. The pedal shaft 30 defines a first axis of rotation 32, which is parallel with a transverse direction. The brake pedal 6 is fixedly attached to the sled 4 in a vertical direction, a longitudinal direction, and the transverse direction, but is rotatable about the pedal shaft 30 in a pedal direction of rotation 34, with the pedal shaft 30 passing through an aperture in the pedal underlink 36 of the brake pedal 6. The pedal underlink 36 extends in a generally longitudinal direction from the brake pedal 6 and facilitates linking the brake pedal 6 to the sled 4.

A roller shaft 38 is fixedly attached to the pedal underlink 36. A roller 40 is rotationally mounted on the roller shaft 38, but fixedly attached to the brake pedal 6 in the vertical, the longitudinal, and the transverse directions. The roller 40 includes an outer circumference 42. The outer circumference 42 may be a planar, convex, or, as is shown in FIG. 1, concave shaped.

The lever 10 includes two lever arms 44 connecting a lever bar 46 to a lever shaft 48. This allows the lever 10 to rotate in a lever direction of rotation 50 about a second axis of rotation 52 defined by the lever shaft 48. The lever bar 46 includes a bar top surface 54 and a bar bottom surface 56. The bar top surface 54 preferably includes a convex shape that matingly engages the concave shape of the roller outer circumference 42. The bar bottom surface 56 preferably has a curved transverse cross section to aid the bottom surface 56 in smoothly engaging and actuating the input piston top surface 18.

In the embodiment of FIG. 1, when the brake pedal 6 is actuated at an activation location above the pedal shaft, the brake pedal 6 rotates on the pedal shaft 30 about the first axis of rotation 34, and the roller 40 is moved downward along a roller direction of motion 58, which is substantially in the vertical direction. The downward movement of the roller 40 presses the lever bar 46 generally downward, with the lever 10 rotating about the second axis of rotation 52, and the bar bottom surface 56 to press against the top surface 18 of the input piston 16. This causes the input piston 16 to move downward along an input piston direction of motion 60, which is substantially in the vertical direction, actuating the brake valve. The second axis of rotation 52 being orthogonal to that of the first axis of rotation 34 allows the lever 10 to translate a lever rotational motion about the second axis of rotation 52 directly to the top surface 18 of the input piston 16 of the brake valve 12.

The base 8 and brake valve 12 are preferably fixed with respect to the cabin floor 14 of a vehicle. With respect to the cabin floor 14, the sled 4 is preferably fixed in the vertical and transverse directions but can be moved in the direction of sled motion 62, which is parallel to the second axis of rotation 52, either manually or with an electric motor (not shown). To aid in moving directly in the direction of sled motion 62, the sled 4 may have a sled recess 64 defined in a transverse profile that receives a portion of the bar top surface 54. This adjustment of the brake pedal and base assembly 2 in the direction of sled motion 62 allows a pedal ratio to be maintained for consistent brake pedal effort and stroke regardless of a location of the brake pedal 6 on the lever bar 46.

With the embodiment of FIG. 1, the brake pedal 6 is actuated by applying actuating force through pressing in a general longitudinal direction at a location vertically above the pedal shaft 30, causing the brake pedal 6 to rotate in a counterclockwise direction from the perspective of FIG. 1. Additionally, the roller 40 is mounted, in the longitudinal direction, on the roller shaft 38 spaced from the brake pedal 6 by the pedal shaft 30. These two arrangements allow the roller 40 to be forced downward in the vertical direction when the brake pedal 6 is depressed.

Figure 2A:
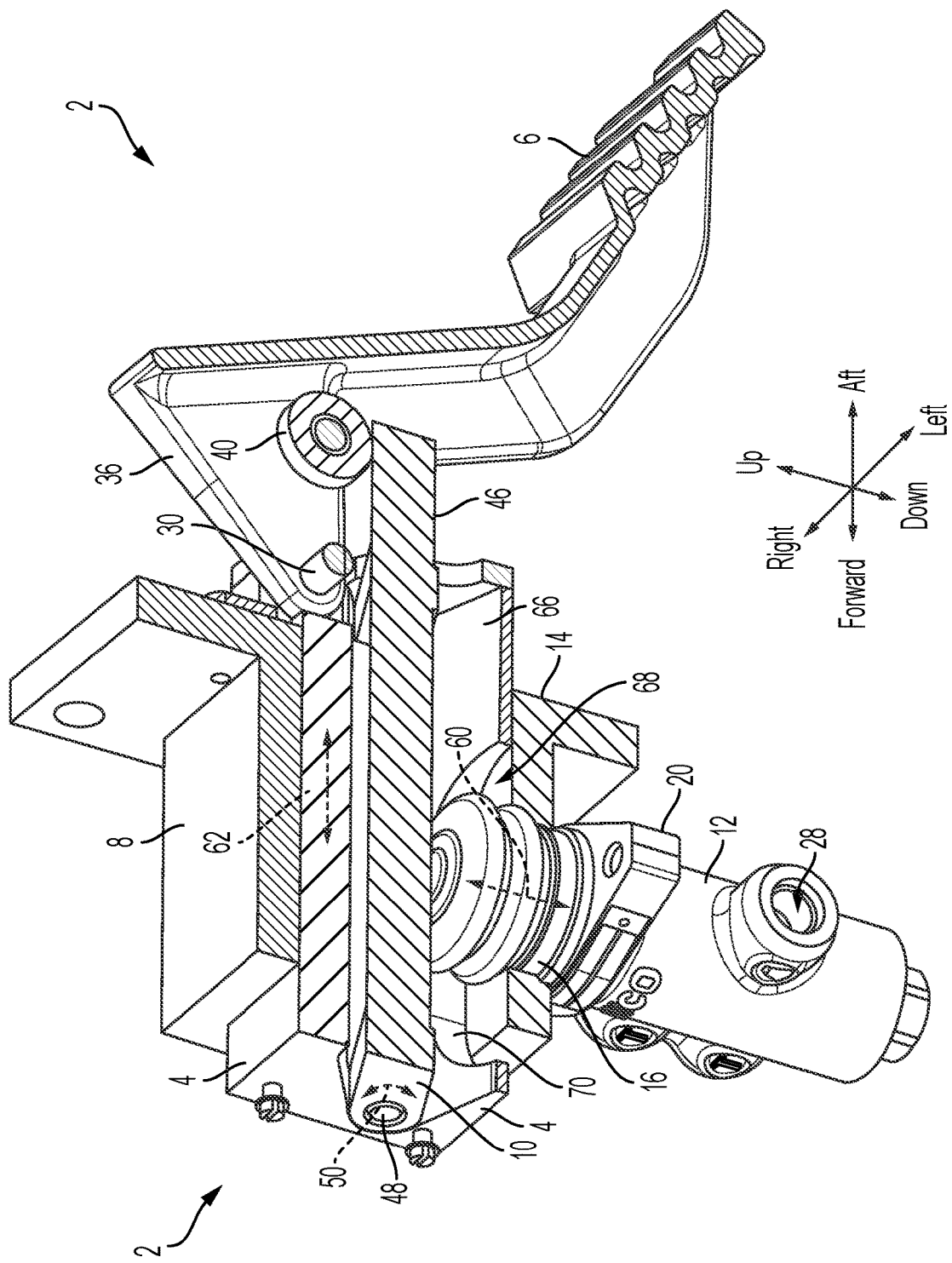
FIG. 2A is an isomeric sectional view of a second embodiment of the disclosed sliding brake pedal and base assembly.
Figure 2B:
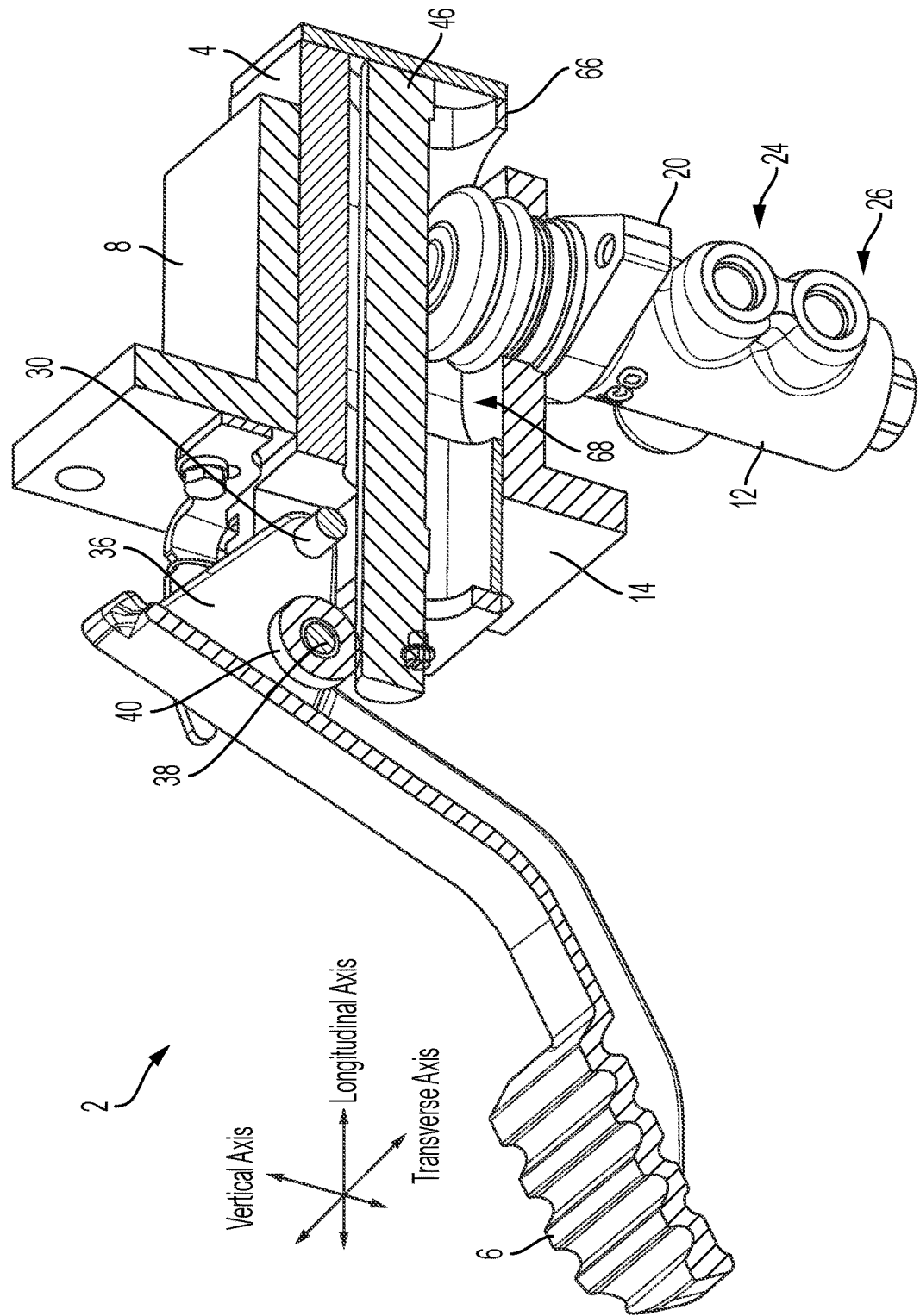
FIG. 2B is an isomeric sectional view of the sliding brake pedal and base assembly of FIG. 2A, viewing an opposite section from a opposite side.

Turning to FIGS. 2A and 2B, a second embodiment of the sliding pedal and base assembly 2 is shown. In FIG. 2A, vertical directions are labeled "up" and "down," longitudinal directions are labeled "forward" and "aft," and transverse directions are labeled "right" and "left," as each would likely be understood by a user of the vehicle, with forward being the forward driving direction of the automobile. In this embodiment, the brake pedal 6 is actuated by applying actuating force through pressing forward in a general longitudinal direction at an actuation location vertically below the pedal shaft 30, causing the brake pedal 6 to rotate in a clockwise direction from the perspective of FIG. 2A. Additionally, the roller 40 is mounted, in the longitudinal direction, on the roller shaft 38 between the pedal shaft 30 and the brake pedal 6. These two changes allow the roller 40 to continue to be forced downward in the vertical direction when the brake pedal 6 is depressed, even in the different relative vertical location.

Additional changes in this embodiment include that the sled 4 is partially encapsulated by the base 8 in the vertical and transverse directions. The base 8 is fixed with respect to the cabin floor 14, while the sled 4 moves in the sled direction of motion 62 within the base 8. A substantially planar bottomed sled footing 66 forms a bottom of the sled 4, giving additional structural support as the sled 4 moves 62 forward and aft, relative to the cabin floor 14 and brake valve 12, to adjust for driver ergonomic comfort. To prevent hitting the input piston 16 during this movement 62, a footing gap 68 space in the transverse—longitudinal plane is defined by a radially inner surface 70 of the footing 66. The size of the footing gap 68 is preferably at least large enough such that the sled 4 may move as far as desired along the sled path of movement as in the embodiment of FIG. 1. More specifically, the footing gap is can be sized longitudinally between 5.0 and 1.1 times a width of the input piston in the longitudinal direction and in some embodiments is sized in the transverse direction between 2.0 and 1.1 times a width of the input piston in the transverse direction.

In this embodiment, the lever 10 may be attached to the base 8 or the sled 4, with each of the attachments offering different structural and ergonomic benefits and drawbacks.

Figure 3:
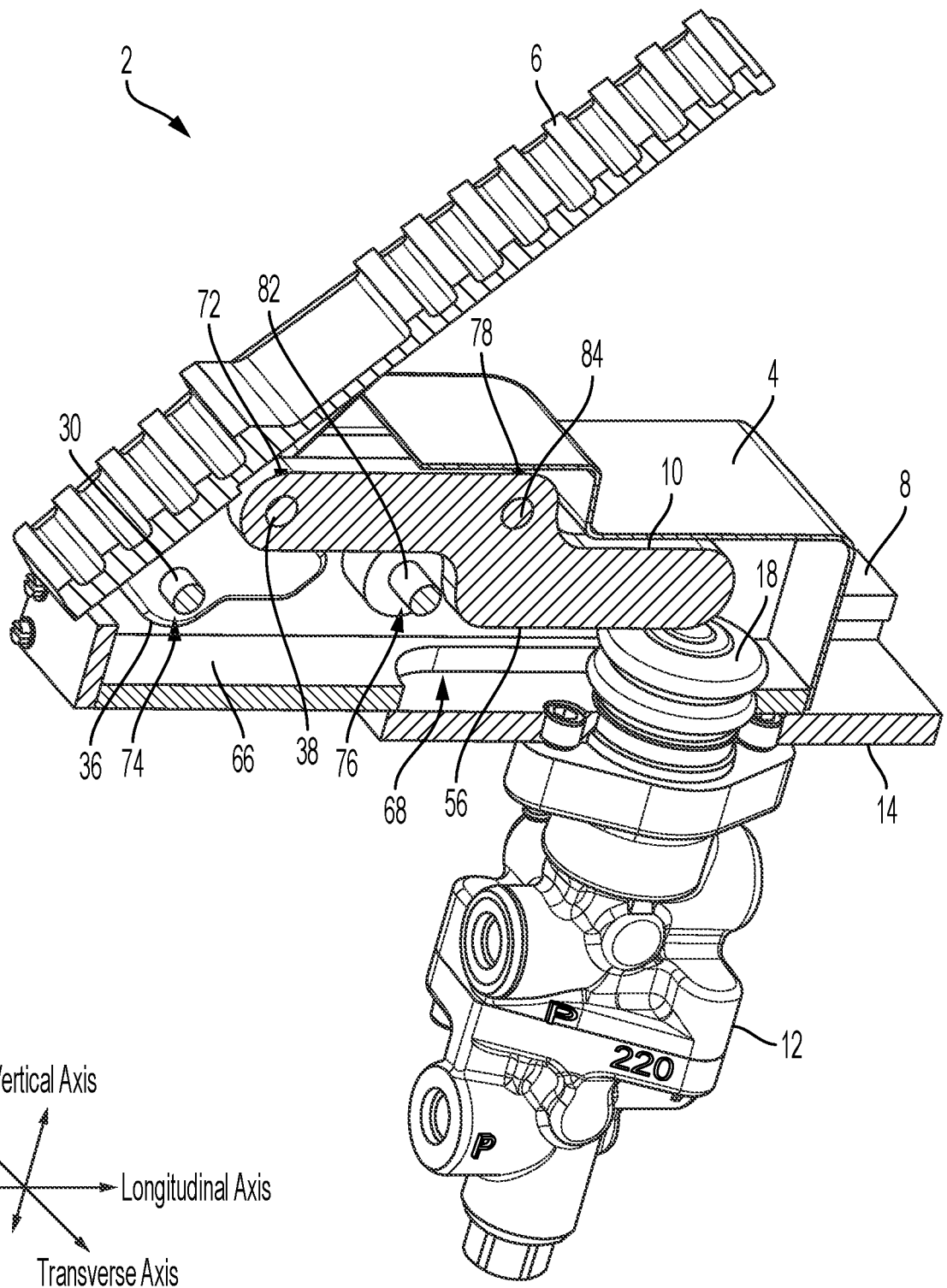
FIG. 3 is an isomeric sectional view of a third embodiment of the disclosed sliding brake pedal and base assembly.
Figure 4:
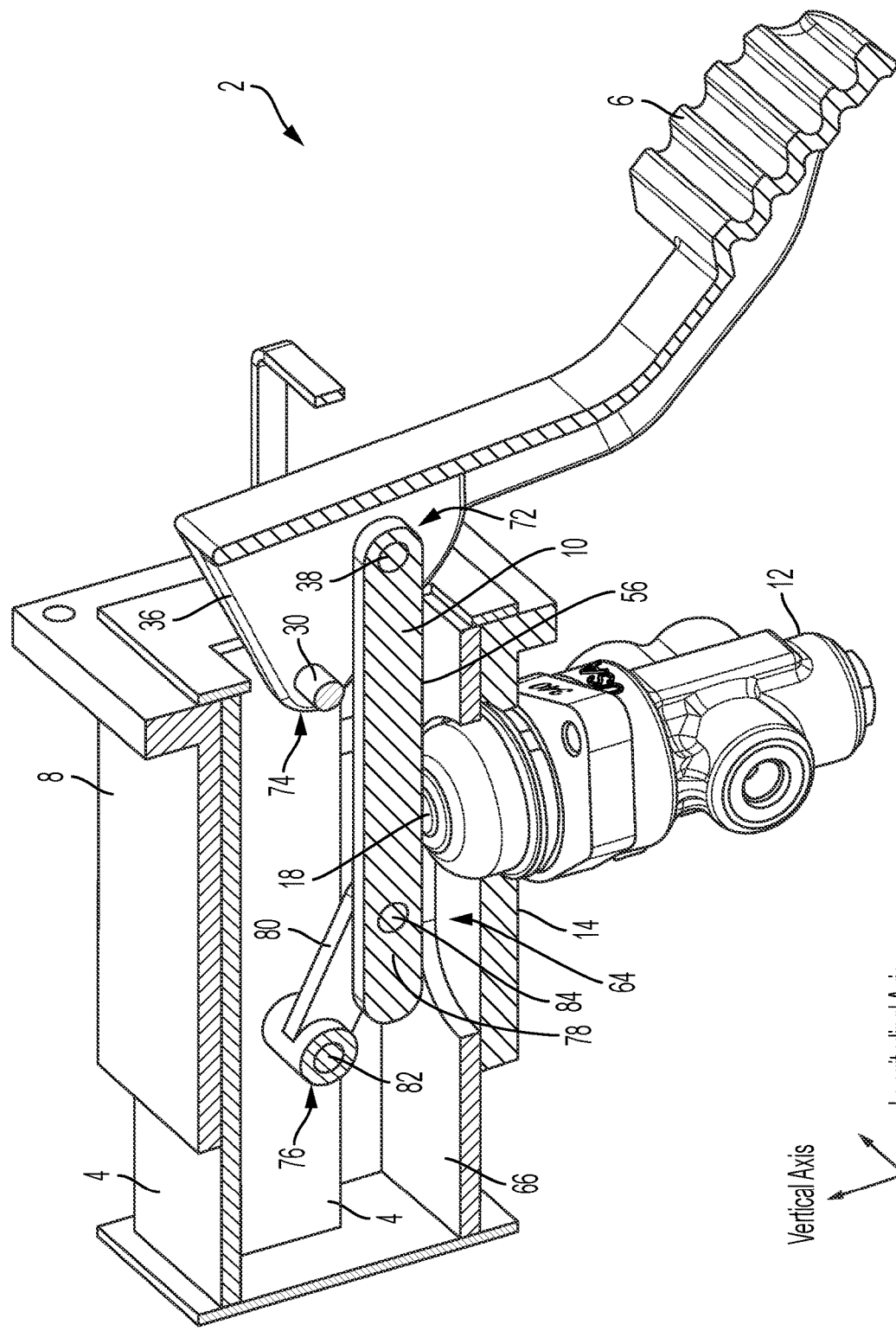
FIG. 4 is an isomeric sectional view of a fourth embodiment of the disclosed sliding brake pedal and base assembly.

Turning next to FIGS. 3 and 4, a further embodiment of the sliding pedal and base assembly 2 is shown. In this embodiment, instead of a roller 40, the lever 10, brake pedal 6, and sled 4, form a planar quadrilateral linkage, and in a preferred embodiment, a parallelogram four-bar linkage, to transfer rotational motion of the brake pedal 6 into predictable vertical motion of the lever 10 for actuation of the input piston 16. In this embodiment, the lever does not rotate about the second axis of rotation 52, but it moves in a vertical-longitudinal plane. In this embodiment there are four joints 72, 74, 76, 78, and each can be a revolute joint.

A first joint 72 is formed by the lever 10 being directly attached to the pedal underlink 36 on the roller shaft 38. Going counterclockwise on FIG. 4, a second joint 74 is formed by the brake pedal 6 connecting to the sled 4 at the pedal shaft 30. A third joint 76 is formed by the sled 4 being connected to a link arm 80 (not shown in FIG. 3) on a sled shaft 82. A fourth joint 78 is formed by the lever 10 being connected to the link arm 80 on a link arm shaft 84. Thus, when the brake pedal 6 is depressed, the four-bar linkage causes the bottom surface 56 of the bar 46 to press downward on the top surface 18 of the input piston 16 of the brake valve 12, thus actuating the brake valve 12. In a specific embodiment, the arrangement forms a parallelogram four-bar linkage, with a spacing between the first and the second joints 72, 74 being equal to, or substantially equal to, a spacing between the third and the fourth joints 76, 78, and a spacing between the first and the fourth joints 72, 78 being equal to, or substantially equal to, a spacing between the second and the third joints 74, 76.

The concept of the embodiments in FIGS. 3 and 4 are based on a parallel four-bar linkage. In this arrangement, one link is a fixed link formed by the sled 4 ("fixed" used here as relative to a current placement of the sled 4 along the longitudinal axis). An adjacent link to the fixed link is formed by the brake pedal 6. An opposite link of the fixed link is formed by the lever 10, a bottom surface 56 of which is used to transfer the motion of the brake pedal 6 to the top surface 18 of the input piston 16 of the brake valve 12. Since this opposite link moves equidistant in the vertical direction along the length of the opposite link, the input piston 16 of the brake valve 12 can receive actuating motion anywhere along the length of the opposite link without variation of pedal effort or stroke. In various embodiments, an adjacent link can be formed as part of the brake pedal 6 or alternately the brake pedal 6 could act directly on a parallel link that actuates the brake valve 12.

In FIG. 3, the brake pedal 6 is actuated by pressing in a generally longitudinal direction at a location vertically above the pedal shaft 30, causing the brake pedal 6 to rotate in a clockwise direction from the perspective of FIG. 3. Additionally, the roller shaft 38 is vertically above the pedal shaft 30. In FIG. 4, the brake pedal 6 is actuated by pressing in a generally longitudinal direction at a location vertically below the pedal shaft 30, causing the brake pedal 6 to rotate in a clockwise direction from the perspective of FIG. 4. Additionally, the roller shaft 38 is vertically below the pedal shaft 30.

A key feature of multiple embodiments of the sliding pedal and base assembly 2 is to allow a vehicle operator to adjust the distance of the brake pedal 6 in relation to cabin floor 14, and thus the operator, and thereby operate a fixed brake valve 12 assembly in an ergonomically comfortable manner. One advantage of multiple embodiments of the sliding pedal and base assembly 2 is an improved human machine interface of the brake pedal 6 for a full power brake system for off-highway vehicles, utility vehicles, and off-road vehicles, which are commonly 4-wheel drive or all-wheel drive vehicles, as a typical brake valve in such vehicles is plumbed in such a manner that eliminates any possibility of moving the valve. According to multiple embodiments, the sliding pedal and base assembly 2 works by transferring the brake pedal 6 motion directly to the stationary brake valve 12 input piston 16. An advantage of multiple embodiments is to allow the operator of the vehicle to adjust the location of the operator brake pedal 6 to fit individual comfort without the use of tools. An advantage of multiple embodiments is increased driver ergonomics in off-road vehicles, without sacrificing robustness of the vehicle braking system and bake lines. An advantage of multiple embodiments is brake valve 12 does not need to be in the operator cabin, which prevents introducing the resulting noise and heat of such placement. An advantage of multiple embodiments is the lower cost of this solution compared to alternatives. An advantage of multiple embodiments is that the brake valve 12 is always stationary with respect to the cabin floor 14, so the connecting lines do not need to be designed with allowable flex for movement of the brake valve 12.

FURTHER EXAMPLE EMBODIMENTS

The following examples pertain to further embodiments, from which numerous permutations and configurations will be apparent.

Example 1 is a sliding brake pedal and base assembly comprising a sled, a brake pedal rotationally attached to the sled, a brake valve with an input piston, a base fixedly attached to the brake valve, and a lever moveable in a first linear direction parallel to a direction of movement of the input piston. The lever receives an actuating force from the brake pedal and delivers the actuating force to a top surface of the input piston. The sled is controllably moveable in a second linear direction orthogonal to the first linear direction.

Example 2 includes the brake pedal and base assembly of Example 1 and further includes a roller rotationally attached to the brake pedal, where the roller transfers the actuating force from the brake pedal to the lever.

Example 3 includes the brake pedal and base assembly of Example 2, where the roller is mounted on a roller shaft that is attached to the brake pedal.

Example 4 includes the brake pedal and base assembly of Example 3, where the brake pedal is mounted on a pedal shaft spaced from the roller shaft.

Example 5 includes the brake pedal and base assembly of Example 4, where when the first linear direction defines up and down, the roller shaft is generally before the pedal shaft along the second linear direction with respect to a driving direction of an automobile when an activation location of the brake pedal is above the pedal shaft, and the pedal shaft is generally before the roller shaft along the second linear direction with respect to the driving direction of the automobile when the activation location of the brake pedal is below the pedal shaft, with up being toward the top surface of the input piston from an interior of the input piston, and down being away from the top surface of the input piston toward interior of the input piston.

Example 6 includes the brake pedal and base assembly of Example 4, where brake pedal rotation about the pedal shaft defines a first axis of rotation orthogonal to both the first linear direction and the second linear direction.

Example 7 includes the brake pedal and base assembly of Example 6, where the lever is attached to one of the base and the sled via a lever shaft, and the lever rotates about the lever shaft in a second direction of rotation parallel to the second linear direction.

Example 8 includes the brake pedal and base assembly of Example 7, where the lever includes one or more lever arms connecting a lever bar to the lever shaft.

Example 9 includes the brake pedal and base assembly of Example 8, where the roller transmits actuating force to a first surface of the lever bar and an opposing second surface of the lever bar transmits force to the top surface of the input piston.

Example 10 includes the brake pedal and base assembly of any of Examples 1-9, where the base is fixedly attached to a cabin floor of an automobile.

Example 11 includes the brake pedal and base assembly of Example 10, where the input piston at least partially passes through to the cabin floor.

Example 12 includes the brake pedal and base assembly of any of Examples 1-11, where the sled includes a sled footing configured to be slidably adjacent to a cabin floor of an automobile.

Example 13 includes the brake pedal and base assembly of Example 12 and further includes a footing gap through hole defined by a radially inner surface of the sled footing.

Example 14 includes the brake pedal and base assembly of Example 13 where a size of the footing gap sized in the second linear direction between 5.0 and 1.1 times a width of the input piston in the second linear direction, and sized in a third linear direction between 2.0 and 1.1 times a width of the input piston in the third linear direction, with the third linear direction being orthogonal to both the first and the second linear directions.

Example 15 includes the brake pedal and base assembly of any of Examples 1-14 and further includes a link arm attached to both the sled and the lever, where the brake pedal, the sled, the lever, and the link arm form a planar quadrilateral linkage.

Example 16 includes the brake pedal and base assembly of Example 15, where the planar quadrilateral linkage is a parallelogram four-bar linkage.

Example 17 includes the brake pedal and base assembly of Example 16, where a first joint is formed by the lever being rotationally attached to the brake pedal via a roller shaft, a second joint is formed by the brake pedal being rotationally attached to the sled via a pedal shaft, a third joint is formed by the link arm being rotationally attached to the sled via a sled shaft, and a fourth joint is formed by the lever being rotationally attached to the link arm via a link arm shaft.

Example 18 includes the brake pedal and base assembly of Example 16 where the sled forms a fixed link in the parallelogram four-bar linkage and the lever forms an opposite link in the parallelogram four-bar linkage.

Example 19 includes the brake pedal and base assembly of Example 16, where a bottom of the lever at a first location where the lever contacts the top surface of the input piston is offset in the first linear direction from a bottom of the lever at a second location aligned with a joint between the link arm and the sled along the first linear direction.

Example 20 is a sliding brake pedal and base assembly that includes a sled, a brake pedal rotationally attached to the sled via a pedal shaft, a brake valve fixedly attached to a cabin floor of an automobile, an input piston of the brake valve extending at least partially through the cabin floor, a base fixedly attached to the brake valve, a lever including a lever bar and a plurality of lever arms, the lever bar being generally moveable in a first linear direction parallel to a direction of movement of the input piston, and a roller rotationally attached to the brake pedal via a roller shaft. The pedal shaft is spaced from the roller shaft and the roller transfers the actuating force from the brake pedal to the lever. The sled includes a sled footing which is slidably adjacent to the cabin floor. A footing gap through hole is defined by a radially inner surface of the sled footing allowing the top surface of the input piston to pass through, where the lever receives an actuating force from the brake pedal and delivers the actuating force to a top surface of the input piston. The sled is controllably moveable in a second linear direction orthogonal to the first linear direction. Brake pedal rotation about the pedal shaft defines a first axis of rotation orthogonal to both the first linear direction and the second linear direction. The lever is attached to one of the base and the sled via a lever shaft, the lever rotates about the lever shaft in a second direction of rotation, and the lever shaft is parallel to the second linear direction and orthogonal to the first axis of rotation. The footing gap is sized in the second linear direction between 5.0 and 1.1 times a width of the input piston in the second linear direction and the footing gap sized in a third linear direction between 2.0 and 1.1 times a width of the input piston in the third linear direction, with the third linear direction being orthogonal to both the first and the second linear directions.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

I claim:

1. A sliding brake pedal and base assembly comprising:
   a sled;
   a brake pedal rotationally attached to the sled, wherein the brake pedal is mounted at a proximal end of the assembly via a pedal shaft;
   a roller shaft mounted either proximal to or distal to the pedal shaft;

a brake valve with an input piston;

a base fixedly attached to the brake valve; and a lever vertically moveable in a direction that is parallel to a direction of movement of the input piston;

wherein the lever receives an actuating force from the brake pedal and delivers the actuating force to a top surface of the input piston; and wherein the sled is controllably moveable in a linear direction parallel to a longitudinal axis of the sled.

2. The sliding brake pedal and base assembly of claim 1, wherein the assembly has a proximal end and a distal end, the brake pedal mounted at the proximal end of the assembly and the roller shaft is distal to the pedal shaft.

3. The sliding brake pedal and base assembly of claim 1, wherein the input piston moves in a direction orthogonal to the longitudinal axis of the sled.

4. The sliding brake pedal and base assembly of claim 1, wherein the sled includes a sled footing configured to be slidably adjacent to a cabin floor of a vehicle.

5. The sliding brake pedal and base assembly of claim 4, further comprising a footing gap defined by a radially inner surface of the sled footing.

6. The sliding brake pedal and base assembly of claim 5 wherein a size of the footing gap in the linear direction is between 5.0 and 1.1 times a width of the input piston.

7. The sliding brake pedal and base assembly of claim 5 wherein in a first position the input piston is at a first end of the footing gap and in a second position the input piston is at a second end of the footing gap and wherein a bottom surface of the lever delivering the actuating force to the top surface of the input piston moves equidistant in a vertical direction in the first position and in the second position.

8. The sliding brake pedal and base assembly of claim 1 wherein the vertically moveable lever and the input piston are in a common vertical plane.

9. A sliding brake pedal and base assembly comprising:

a sled;

a brake pedal rotationally attached to the sled;

a brake valve with an input piston;

a base fixedly attached to the brake valve; and a lever vertically moveable in a direction that is parallel to a direction of movement of the input piston;

a link arm attached to both the sled and the lever, where the brake pedal, the sled, the lever, and the link arm form a planar quadrilateral linkage;

wherein the lever receives an actuating force from the brake pedal and delivers the actuating force to a top surface of the input piston; and wherein the sled is controllably moveable in a linear direction parallel to a longitudinal axis of the sled.

10. The sliding brake pedal and base assembly of claim 9, wherein the planar quadrilateral linkage is a parallelogram four-bar linkage and wherein a first joint is formed by the lever being rotationally attached to the brake pedal via a roller shaft, a second joint is formed by the brake pedal being rotationally attached to the sled via a pedal shaft, a third joint is formed by the link arm being rotationally attached to the sled via a sled shaft, and a fourth joint is formed by the lever being rotationally attached to the link arm via a link arm shaft.

11. The sliding brake pedal and base assembly of claim 10 wherein the sled forms a fixed link in the parallelogram four-bar linkage and the lever forms an opposite link in the parallelogram four-bar linkage.

12. The sliding brake pedal and base assembly of claim 9 wherein the planar quadrilateral linkage is in a vertical plane.

* * * * *